United States Patent
Sung

(10) Patent No.: US 8,915,817 B2
(45) Date of Patent: *Dec. 23, 2014

(54) TORQUE SPLIT TYPE AUTOMATIC TRANSMISSION

(75) Inventor: Duk Hwan Sung, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 873 days.

This patent is subject to a terminal disclaimer.

(21) Appl. No.: 12/877,758

(22) Filed: Sep. 8, 2010

(65) Prior Publication Data

US 2011/0124456 A1 May 26, 2011

(30) Foreign Application Priority Data

Nov. 23, 2009 (KR) ........................ 10-2009-0113504

(51) Int. Cl.
*F16H 47/08* (2006.01)

(52) U.S. Cl.
USPC ............................................. 475/47

(58) Field of Classification Search
USPC ........................................ 475/35, 36, 47, 53
See application file for complete search history.

(56) References Cited

U.S. PATENT DOCUMENTS

| | | | |
|---|---|---|---|
| 2,682,786 A | 7/1954 | Flinn | |
| 2,924,992 A | 2/1960 | Edsall | |
| 3,025,721 A | 3/1962 | De Lorean | |
| 3,065,652 A | 11/1962 | Kugel et al. | |
| 3,577,804 A | 5/1971 | Ohno et al. | |
| 3,749,209 A | 7/1973 | Weinrich et al. | |
| 4,014,223 A | 3/1977 | Pierce, Jr. | |
| 4,226,123 A | 10/1980 | Croswhite | |
| 4,398,436 A | 8/1983 | Fisher | |
| 5,314,387 A | 5/1994 | Hauser et al. | |
| 5,711,735 A * | 1/1998 | Park | 475/44 |
| 7,297,084 B2 | 11/2007 | Kimura et al. | |
| 2007/0251791 A1* | 11/2007 | Fujiwara et al. | 192/3.29 |
| 2011/0124457 A1* | 5/2011 | Sung | 475/53 |
| 2011/0124458 A1* | 5/2011 | Sung | 475/71 |
| 2011/0124464 A1* | 5/2011 | Sung | 475/330 |

FOREIGN PATENT DOCUMENTS

| | | |
|---|---|---|
| CN | 1294991 A | 5/2001 |
| CN | 1363780 A | 8/2002 |
| CN | 1180801 C | 12/2004 |
| CN | 201288805 Y | 8/2009 |
| DE | 1 032 109 | 6/1958 |

* cited by examiner

*Primary Examiner* — Erin D Bishop
(74) *Attorney, Agent, or Firm* — Morgan, Lewis & Bockius LLP

(57) ABSTRACT

A torque split type automatic transmission which transmits torque output from an engine through two paths, adds the torque passing through and increased in each path, and outputs a final torque, may be provided wherein the torque of the engine is dividedly transmitted to first and second power delivery paths, a launching device for converting the torque and a transmission device for achieving multiple-shift are disposed on the first power delivery path in series, and a torque combining device is disposed on the second power delivery path, and wherein the first power delivery path is connected to the torque combining device such that output torque of the first power delivery path is added to output torque of the second output path to output the final torque.

15 Claims, 6 Drawing Sheets

FIG. 3

|     | C1 | C2 | C3 | B1 | B2 | F |
|-----|----|----|----|----|----|---|
| D1  | ●  |    |    | ○  |    | ○ |
| D2  | ●  |    |    |    | ●  |   |
| D3  | ●  | ●  |    |    |    |   |
| D4  |    | ●  |    |    | ●  |   |
| REV |    |    | ●  | ●  |    |   |

(A)

(B)

TORQUE SPLIT TYPE AUTOMATIC TRANSMISSION

CROSS-REFERENCE TO RELATED APPLICATION

The present application claims priority to Korean Patent Application No. 10-2009-0113504 filed in the Korean Intellectual Property Office on Nov. 23, 2009, the entire contents of which is incorporated herein for all purposes by this reference.

BACKGROUND OF THE INVENTION

1. Field of the Invention

The present invention relates to a torque split type automatic transmission which is applied to vehicles. More particularly, the present invention relates to a torque split type automatic transmission which increases torque by transmitting the torque output from an engine through two paths and adding the torque passing through each path.

2. Description of Related Art

Recently, engine output increases by 20-30% compared with a conventional engine with the same exhaust amount and size due to development of engine technologies.

Since a conventional transmission includes only one power delivery path, all the torque of the engine is directly transmitted to a launching device such as a torque converter or a clutch. Therefore, if the engine output increases, design of the transmission must be changed so as to increase torque delivery capacity.

In order to increase the torque delivery capacity, strength of an axle must be strengthened and the number of friction members must be increased due to characteristics of a power delivery device. However, if the strength of the axle is strengthened, weight of the axle should be increased. In addition, if the number of the friction members is increased, size of the transmission should be increased. Therefore, fuel consumption and power performance of a vehicle may be deteriorated due to increase in the weight of the axle and installability of the transmission may be deteriorated due to increase in the size of the transmission.

Since it is needed to change a design of the launching device such as the torque converter in order to increase torque capacity thereof, much development cost and time is needed.

Recently, a torque split type transmission which transmits the torque through at least two power delivery paths is developing. The torque split type transmission has a merit that the torque capacity can increase with a few changes in the design.

Some examples of the torque split type transmission are described in U.S. Pat. Nos. 4,014,223, 4,117,745, and 4,226,123 having a power delivery path shown in FIG. 6A and in U.S. Pat. No. 5,201,692 having a power delivery path shown in FIG. 6B.

Some examples of the torque split type transmission are described in U.S. Pat. Nos. 4,014,223, 4,117,745, and 4,226,123 having a power delivery path shown in FIG. 6A and in U.S. Pat. No. 5,201,692 having a power delivery path shown in FIG. 6B.

According to the torque split type transmission shown in FIG. 6B, the engine is increased in the torque converter which is the launching device 120. After that, the torque is dividedly delivered to the driving wheel through the planetary gear set of the torque split device 121 and to a continuously variable transmission of the transmission device 122. The torque output from the transmission device 122 is added to the torque delivered from the torque split device 121 to the driving wheel.

According to the torque split type transmission shown in FIG. 6A, all the increased torque is delivered to the transmission device and it may cause problems in the torque delivery capacity of the transmission device.

According to the torque split type transmission shown in FIG. 6B, the continuously variable transmission is used as the transmission device. If large torque is delivered to the continuously variable transmission, torque split efficiency may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a torque split type automatic transmission having advantages of reducing torque delivered to a launching device and a transmission device by delivering the torque from an engine through two paths. Therefore, torque delivery capacity and size of the torque split type automatic transmission may not be increased according to the present invention.

A torque split type automatic transmission which transmits torque output from an engine through two paths, adds the torque passing through and increased in each path, and outputs a final torque, may be provided, wherein the torque of the engine is dividedly transmitted to first and second power delivery paths, a launching device for converting the torque and a transmission device for achieving multiple-shift are disposed on the first power delivery path in series, and a torque combining device is disposed on the second power delivery path, and wherein the first power delivery path is connected to the torque combining device such that output torque of the first power delivery path is added to output torque of the second output path to output the final torque.

The launching device disposed on the first power delivery path may be a torque converter, the transmission device disposed on the first power delivery path may be a multiple-shift transmission comprising a plurality of planetary gear sets, clutches, and brakes, and the torque combining device disposed on the second power delivery path may be a planetary gear set.

The torque transmitted through the second power delivery path may be larger than the torque transmitted through the first power delivery path.

In another aspect of the present invention, the torque split type automatic transmission may include a launching device being a torque converter, receiving a portion of torque of an engine, converting the portion of the torque by a torque converting ratio, and outputting the portion of the torque through a second power delivery shaft, a transmission device receiving the portion of the torque from the launching device and being a multiple-shift transmission converting the torque when shifting, and a torque combining device being a planetary gear set comprising three rotational elements so as to receive the other portion of the torque of the engine, to receive the portion of the torque from the transmission device, and to add and output the portion of the torque and the other portion of the torque to output a final torque.

The launching device, the transmission device, and the torque combining device may be sequentially disposed from the engine, wherein the launching device and the transmission device are sequentially disposed from the engine on the second power delivery shaft and wherein the torque combining device is disposed on a first power delivery shaft connected to the engine.

The second power delivery shaft may be connected to a turbine of the torque converter, and the transmission device is disposed at a rear portion of the second power delivery shaft, wherein an impeller of the torque converter is connected to a front cover engaged to the engine, and wherein the turbine is connected to the second power delivery shaft by interposing a damper, and the impeller and the turbine is selectively coupled by a lock-up clutch.

The transmission device may include first and second planetary gear sets being single pinion planetary gear sets, wherein a first planet carrier is directly connected to a second ring gear and a first ring gear is directly connected to a second planet carrier such that a first sun gear is operated as a first rotational element, the first planet carrier and the second ring gear are operated as a second rotational element, the first ring gear and the second planet carrier are operated as a third rotational element, and a second sun gear is operated as a fourth rotational element, and wherein the first rotational element is selectively connected to the second power delivery shaft directly connected to the engine by interposing a first clutch, the third rotational element is selectively connected to the second power delivery shaft by interposing a second clutch and is selectively connected to a transmission housing by interposing a first brake disposed in parallel with a one-way clutch, the fourth rotational element is selectively connected to the second power delivery shaft by interposing a third clutch and is selectively connected to the transmission housing by interposing a second brake, and the second rotational element is operated as an output element and is engaged to one rotational element of the torque combining device through a transfer shaft.

The first clutch may be disposed at a front portion of the first planetary gear set, the first and second brakes and the one-way clutch are disposed at a rear portion of an exterior of the second planetary gear set, and the second and third clutches are disposed at a rear portion of the second planetary gear set.

The torque combining device may include a third planetary gear set of a single pinion planetary gear set, and wherein a third sun gear is connected to a first power delivery shaft to receive the other portion of the torque of the engine, a third ring gear is coupled to a transfer shaft provided with one end engaged with a first output gear of the transmission device, and a third planet carrier is connected to a second output gear to output the final torque, wherein a direct-coupling clutch for selectively coupling the first power delivery shaft with the second output gear is disposed between the first power delivery shaft and the second output gear.

The torque combining device may be disposed on a transfer shaft disposed in parallel with and apart from the transmission device by a predetermined distance, wherein the transfer shaft is divided into first and second shafts and the torque combining device is disposed between the first and second shafts, and wherein the first shaft receives the torque from a first output gear of the transmission device and is connected to a third ring gear, the second shaft receives the torque from the first power delivery shaft and is connected to a third sun gear, and a third planet carrier is connected to a second output gear to output the final torque, and wherein a direct-coupling clutch is disposed between the second shaft and the second output gear to directly couple the second shaft and the second output gear.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is an operational chart for a transmission device according to exemplary embodiments of the present invention.

Figure 1:
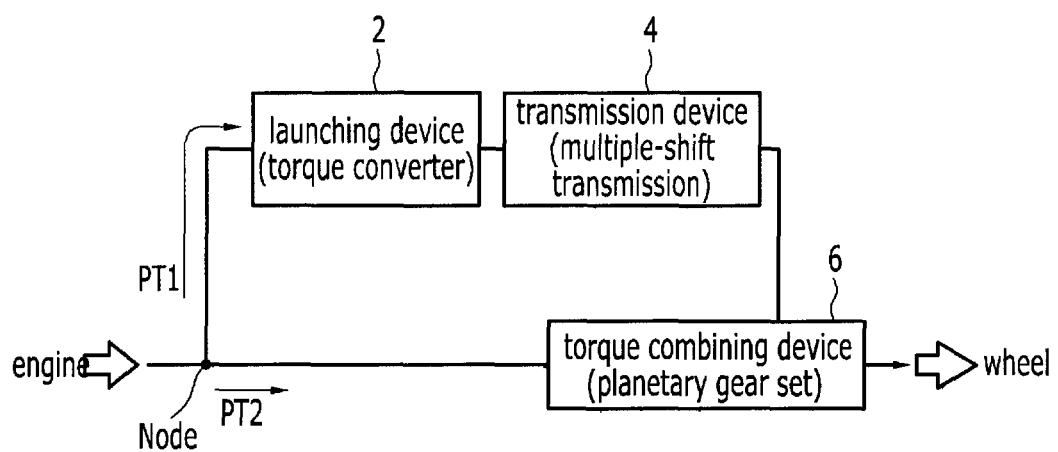
FIG. 1 is a block diagram for explaining concept of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

FIG. 1 is a block diagram for explaining concept of the present invention.

As shown in FIG. 1, torque of the engine is divided into two portions and each portion of the torque is delivered respectively through first and second power delivery paths PT1 and PT2 according to an exemplary embodiment of the present invention.

A launching device 2 and a transmission device 4 which increase the torque are disposed in series on the first power delivery path PT1, and a torque combining device 6 is disposed on the second power delivery path PT2. An output of the first power delivery path PT1 is connected to the torque combining device 6 such that the torque increased through the first power delivery path PT1 is added to the torque passing through the second power delivery path PT2. A final output is output from the torque combining device 6.

The launching device 2 may be a torque converter, and increases the torque output from the engine.

A multiple-shift transmission applicable to an automatic transmission is used as the transmission device 4. The transmission device 4 increases the torque when shifting. It is exemplarily described in this specification that a multiple-shift transmission realizing four forward speeds and one reverse speed is used as the transmission device 4, but it is well known to a person of an ordinary skill in the art that other multiple-shift transmissions with different structure from the exemplary embodiment of the present invention may be used.

Rotation speed input to the transmission device 4 is reduced when shifting, and thus, the torque is increased.

The torque increased when passing through the launching device 2 and the transmission device 4 is transmitted to the torque combining device 6 and then is added to the torque transmitted from the second power delivery path PT2. After that, a final torque is transmitted to a driving wheel.

Since the torque output from the engine is transmitted through two paths, not through one path, the torque transmitted to the launching device 2 and the transmission device 4 may be reduced. Since the torque applied to the launching device 2 and the transmission device 4 is small, design capacity (diameter of a shaft, thickness of a case, size and the number of clutch) of the components used in the launching device 2 and the transmission device 4 may be smaller than that of the components used in a conventional launching device 2 and transmission device 4. Accordingly, size of the transmission can be reduced.

Figure 2:
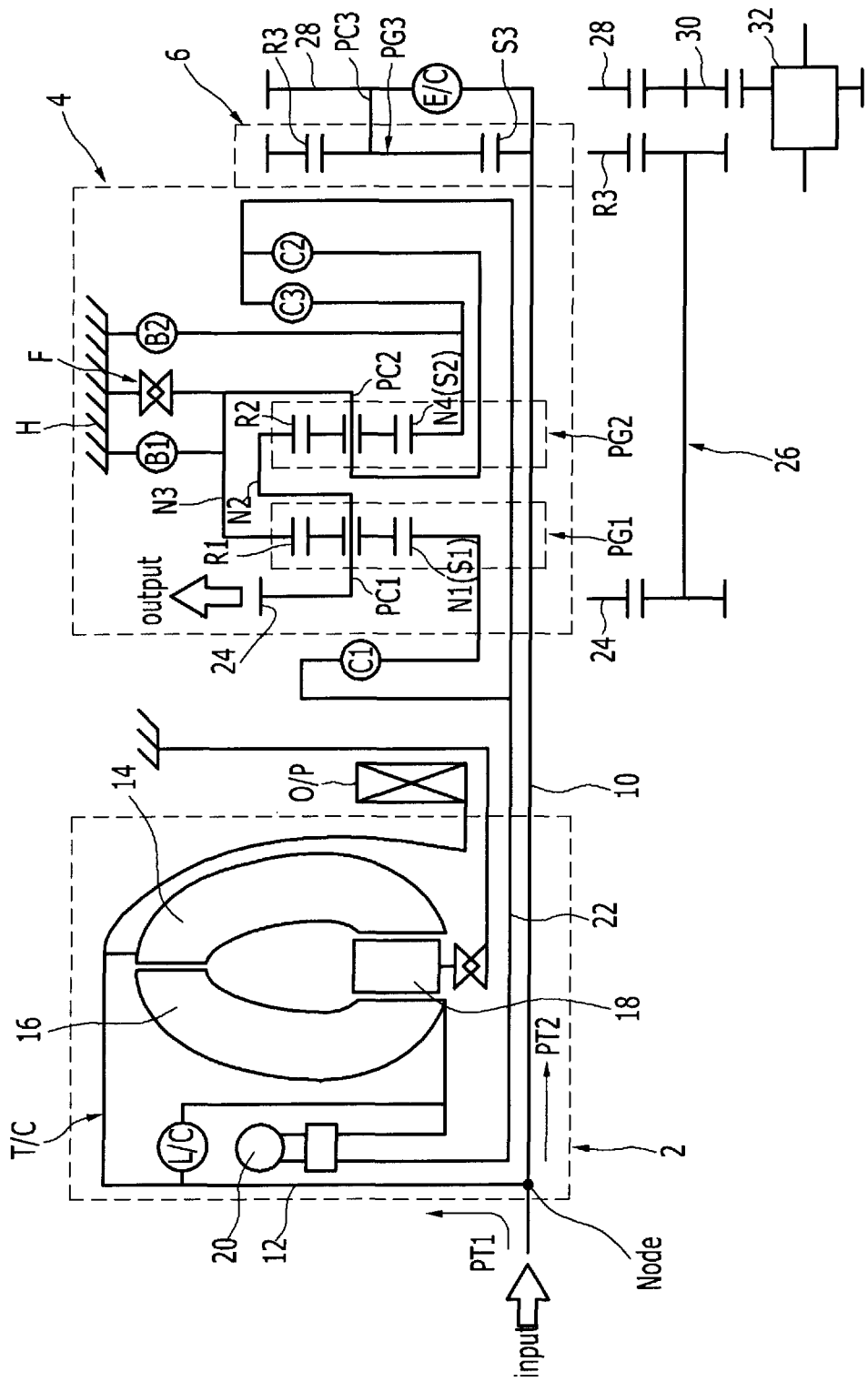
FIG. 2 is a schematic diagram of a torque split type automatic transmission according to an exemplary embodiment of the present invention.

FIG. 2 is a schematic diagram of a torque split type automatic transmission according to a first exemplary embodiment of the present invention.

As shown in FIG. 2, the launching device 2, the transmission device 4, and the torque combining device 6 are disposed on a first power delivery shaft 10 directly connected to the engine. The launching device 2, the transmission device 4, and the torque combining device 6 are disposed in a sequence of the launching device 2, the transmission device 4, and the torque combining device 6 from the engine.

The torque converter T/C of the launching device 2 includes a front cover 12 connected to a crankshaft of the engine and rotating, an impeller 14 connected to and rotating with the front cover 12, a turbine 16 facing the impeller 14, and a stator 18 disposed between the impeller 14 and the turbine 16 and delivering automatic transmission oil flowing out from the turbine 16 to the impeller 14 after changing flowing direction of the automatic transmission oil.

The stator 18 for delivering the automatic transmission oil to the impeller 14 has the same rotational center as the front cover 12, and a lock-up clutch L/C for selectively coupling the impeller 14 with the turbine 16 is disposed between the front cover 12 and the turbine 16.

In addition, the turbine 16 is connected to a second power delivery shaft 22 by interposing a damper 20 therebetween, and a rear portion of the second power delivery shaft 22 is connected to the transmission device 4.

The transmission device 4 includes first and second planetary gear sets PG1 and PG2 being single pinion planetary gear sets. A first planet carrier PC1 is directly connected to a second ring gear R2 and a first ring gear R1 is directly connected to a second planet carrier PC2 such that the transmission device 4 has four rotational elements N1, N2, N3, and N4.

Accordingly, a first sun gear S1 is set as a first rotational element N1, the first planet carrier PC1 and the second ring gear R2 are set as a second rotational element N2, the first ring gear R1 and the second planet carrier PC2 are set as a third rotational element N3, and a second sun gear S2 is set as a fourth rotational element N4.

In addition, the first sun gear S1 of the first rotational element N1 is selectively connected to the second power delivery shaft 22 by interposing a first clutch C1. The second planet carrier PC2 forming the third rotational element N3 is selectively connected to the second power delivery shaft 22 through a second clutch C2 and is selectively connected to a transmission housing H through a first brake B1 disposed in parallel with a one-way clutch F.

In addition, the second sun gear S2 forming the fourth rotational element N4 is selectively connected to the second power delivery shaft 22 through a third clutch C3 and is selectively connected to the transmission housing H through a second brake B2, and the first planet carrier PC1 forming the second rotational element N2 is connected to a first output gear 24 and is operated as an output element. The first output gear 24 transmits the torque to the torque combining device 6 through a transfer shaft 26.

Figure 3:
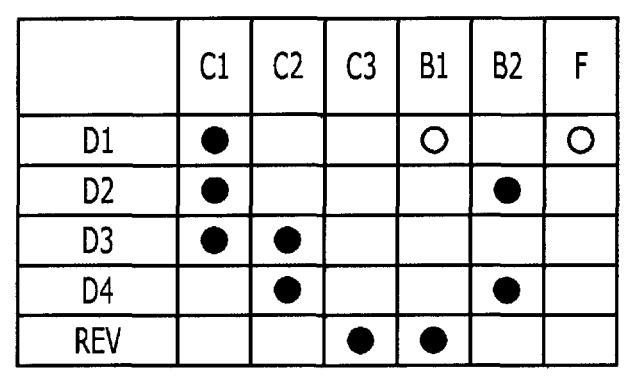

As shown in FIG. 3, the clutches C1, C2, and C3 and the brakes B1 and B2 are selectively operated at each shift-speed.

The first clutch C1 and the first brake B1 are operated at a first forward speed D1, the first clutch C1 and the second brake B2 are operated at a second forward speed D2, the first and second clutches C1 and C2 are operated at a third forward speed D3, the second clutch C2 and the second brake B2 are operated at a fourth forward speed D4, and the third clutch C3 and the first brake B1 are operated at a reverse speed REV.

In this specification, it is described that the first clutch C1 and the first brake B1 are operated at the first forward speed D1. However, in a case that the first brake B1 is disposed in parallel with the one-way clutch F, the first brake B1 is not operated but the one-way clutch F is operated at the first speed in D range so as to improve shift feel when shifting to the second speed.

Figure 4:
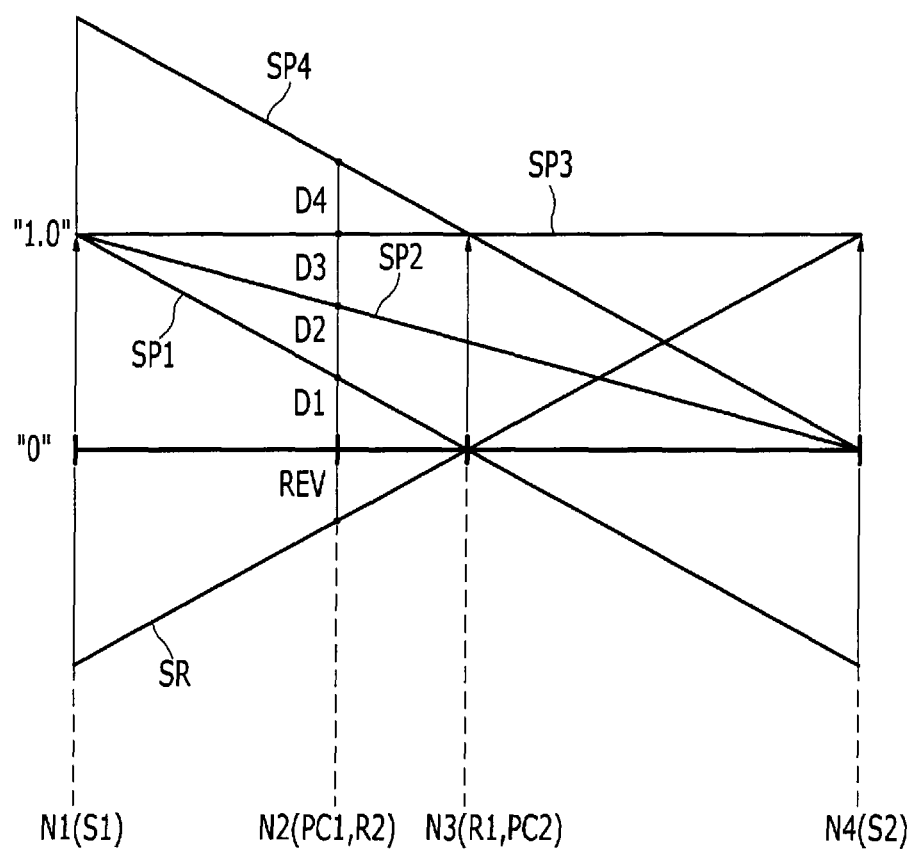
FIG. 4 is a lever diagram for a transmission device according to exemplary embodiments of the present invention.

FIG. 4 is a lever diagram for a transmission device according to exemplary embodiments of the present invention.

In FIG. 4, a lower horizontal line represents a rotational speed is "0", and an upper horizontal line represents a rotation speed is "1.0", that is, the rotational speed thereof is the same as that of the second power delivery shaft 22.

Four vertical lines in FIG. 4 represent the first sun gear S1 of the first rotational element N1, the first planet carrier PC1 and the second ring gear R2 of the second rotational element N2, the first ring gear R1 and the second planet carrier PC2 of the third rotational element N3, and the second sun gear S2 of the fourth rotational element N4 sequentially from the left, and distances therebetween are set according to gear ratios of the first and second planetary gear set PG1 and PG2 (teeth number of the sun gear/teeth number of the ring gear).

Position of each rotation element in the lever diagram is well known to a person of an ordinary skill in the art who designs a gear train, and thus detailed description will be omitted.

[First Forward Speed]

As shown in FIG. 3, the first clutch C1 and the first brake B1 are operated at the first forward speed D1.

In a state that the torque of the second power delivery shaft 22 is input to the first rotational element N1 by an operation of the first clutch C1, the third rotational element N3 is operated as a fixed element by an operation of the first brake B1 such that a first shift line SP1 is formed. Therefore, the first forward speed D1 is output through the second rotational element N2 which is the output element.

[Second Forward Speed]

The first brake B1 which is operated at the first forward speed D1 is released, and the second brake B2 is operated at the second forward speed D2.

In a state that the torque of the second power delivery shaft 22 is input to the first rotational element N1 by the operation of the first clutch C1, the fixed element is changed from the third rotational element N3 to the fourth rotational element N4 by an operation of the second brake B2 such that a second shift line SP2 is formed. Therefore, the second forward speed D2 is output through the second rotational element N2 which is the output element.

[Third Forward Speed]

As shown in FIG. 3, the second brake B2 which is operated at the second forward speed D2 is released, and the second clutch C2 is operated at the third forward speed D3.

In a state that the torque of the second power delivery shaft 22 is input to the first rotational element N1 by the operation of the first clutch C1, the torque of the second power delivery shaft 22 is also input to the third rotational element N3 by an operation of the second clutch C2 such that the first and second planetary gear sets PG1 and PG2 become direct-coupling states and a third shift line SP3 is formed. Therefore, the third forward speed D3, the rotational speed of which is the same as that of the second power delivery shaft 22, is output through the second rotational element N2 which is the output element.

[Fourth Forward Speed]

As shown in FIG. 3, the first clutch C1 which is operated at the third forward speed D3 is released, and the second brake B2 is operated at the fourth forward speed D4.

In a state that the torque of the second power delivery shaft 22 is input to the third rotational element N3 by the operation of the second clutch C2, the fourth rotational element N4 is operated as the fixed element by the operation of the second brake B2 such that a fourth shift line SP4 is formed. Therefore, the fourth forward speed D4 is output through the second rotational element N2 which is the output element.

[Reverse Speed]

As shown in FIG. 3, the first brake B1 and the third clutch C3 are operated at the reverse speed REV.

In a state that the torque of the second power delivery shaft 22 is input to the fourth rotational element N4 by an operation of the third clutch C3, the third rotational element N3 is operated as the fixed element by the operation of the first brake B1 such that a reverse shift line SR is formed. Therefore, the reverse speed REV is output through the second rotational element N2 which is the output element.

The torque combining device 6 is disposed between the transfer shaft 26 receiving the torque output from the transmission device 4 and the first power delivery shaft 10.

The torque combining device 6 includes a third planetary gear set PG3 which is a single pinion planetary gear set. A third sun gear S3 is connected to the first power delivery shaft 10 and receives a portion of the torque of the engine, a third ring gear R3 is engaged to a rear gear of the transfer shaft 26 which is engaged to the second rotational element N2 of the transmission device 4 and receives the torque of the transmission device 4. That is, the third ring gear R3 receives the torque of the transmission device 4 through the transfer shaft 26.

Accordingly, the third planet carrier PC3 receives the torques of the third sun gear S3 and the third ring gear R3, and thereby rotates so as to transmit the torque through a second output gear 28 integrally formed with the third planet carrier PC3. Therefore, a final torque is output through the second output gear 28.

The final torque is transmitted to a differential apparatus 32 through an idling gear 30 and is then transmitted to the driving wheel. Power delivery path downstream to the second output gear 28 is well known to a person of an ordinary skill in the art, and a detailed description thereof will be omitted.

In addition, the second output gear 28 is connected to the first power delivery shaft 10 by interposing a direct-coupling clutch E/C therebetween, and the direct-coupling clutch E/C is operated only when the engine is directly connected to the driving wheel.

A torque split ratio at a node is defined by a torque converting ratio of the launching device 2, a shift ratio of the transmission device 4, and a planetary gear ratio of the torque combining device 6. Generally, the torque converting ratio is set as 2, and the planetary gear ratio is set as 3. Therefore, the torque split ratio at the node is defined mainly by the shift ratio of the transmission device 4.

The planetary gear ratio is defined by a ratio of teeth number of a ring gear and sun gear. If the planetary gear ratio is 3 and the torque output through the planet carrier is 100, one fourth of the torque (=25) is input from the sun gear and three fourth of the torque (=75) is input from the ring gear.

Therefore, if the torque split ratio at the node can be calculated from the torque converting ratio and the shift ratio of the transmission device.

Calculation of the torque split ratio is well known to and can be done by a person of an ordinary skill in the art, and thus a detailed description thereof will be omitted.

Since the torque of the engine is transmitted through two paths, not through one path according to a first exemplary embodiment of the present invention, design capacity (diameter of a shaft, thickness of a case, size and the number of clutch) of the components used in the launching device and the transmission device may be smaller than that of the components used in a conventional launching device and transmission device. Accordingly, size of the transmission can be reduced.

Figure 5:
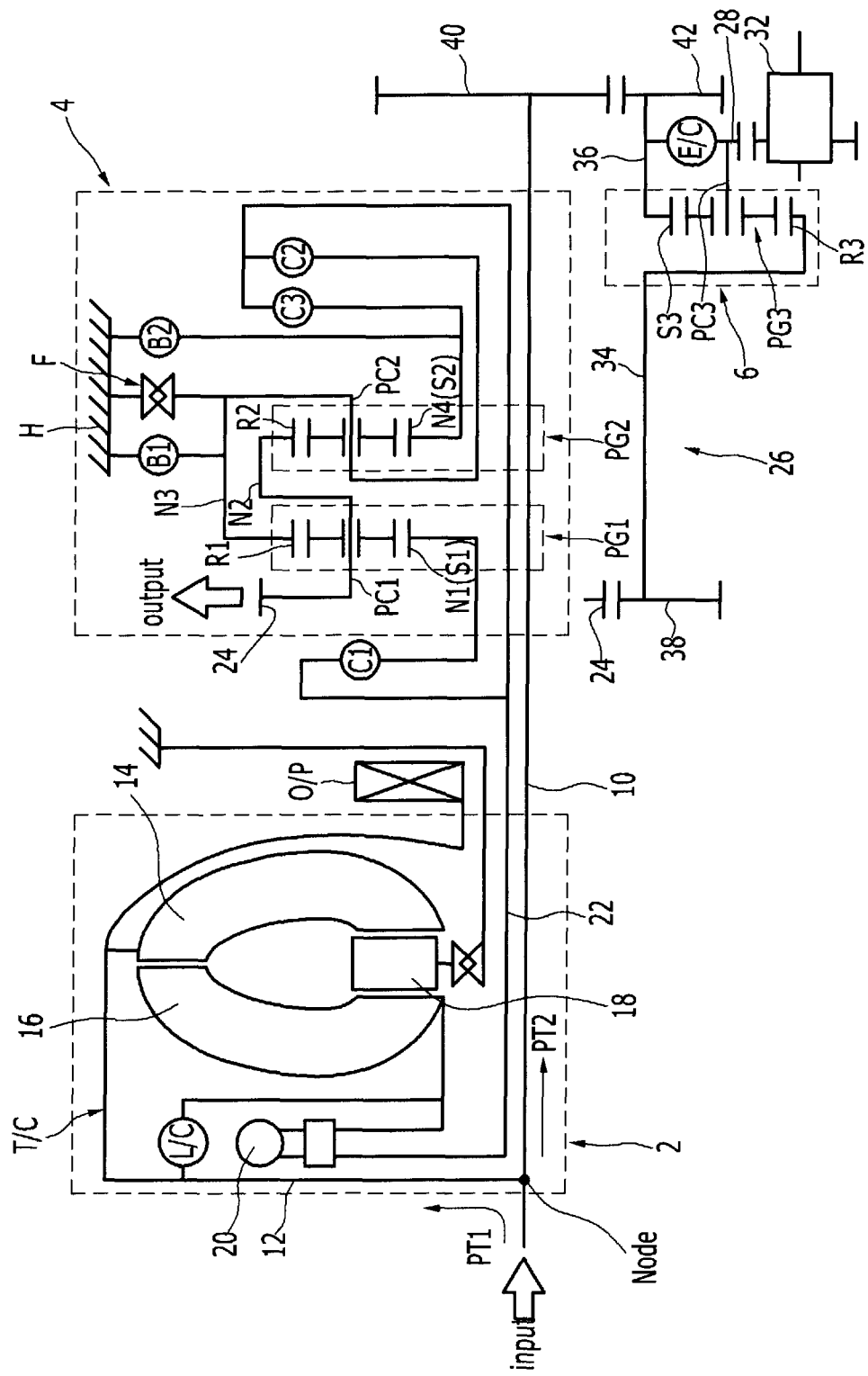
FIG. 5 is a schematic diagram of a torque split type automatic transmission according to an exemplary embodiment of the present invention.
Figure 6:
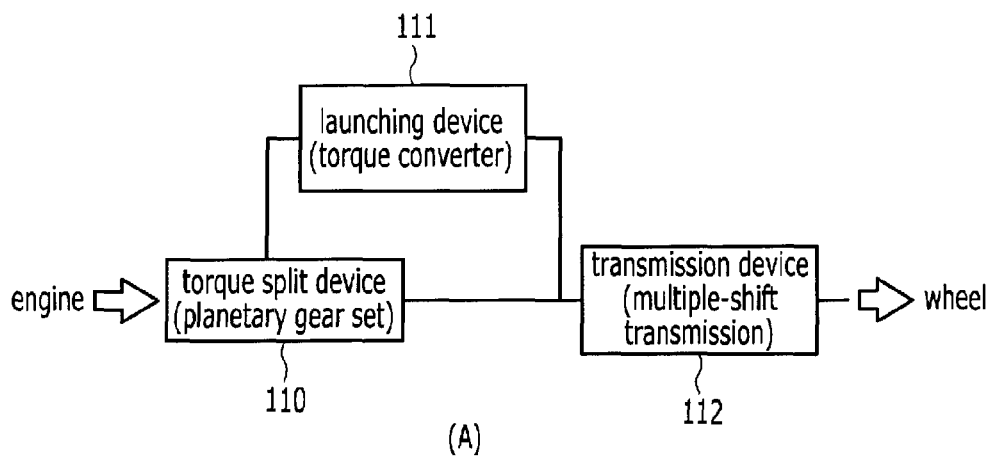
FIGS. 6A and 6B are block diagrams showing power delivery path of the conventional art.
Figure 6:
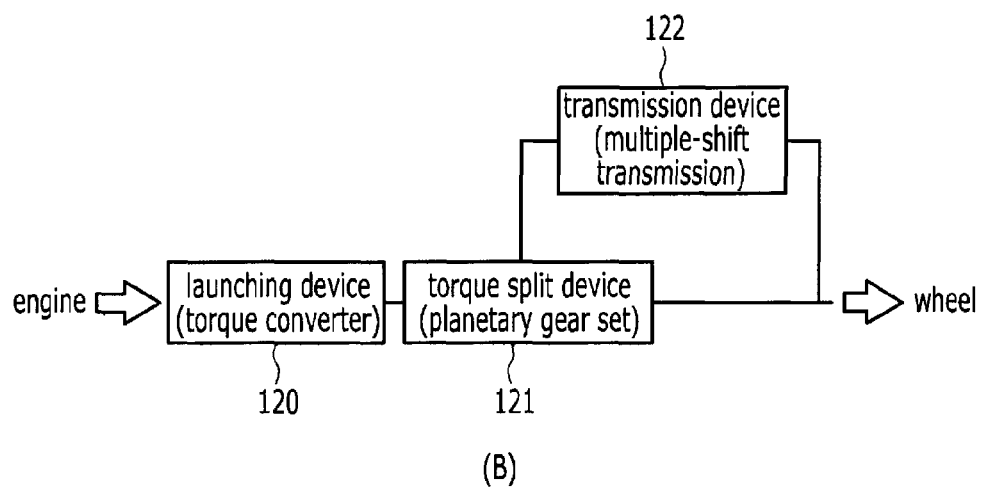

FIG. 5 is a schematic diagram of a torque split type automatic transmission according to a second exemplary embodiment of the present invention. As shown in FIG. 5, according to the second exemplary embodiment of the present invention, the torque combining device 6 is disposed on the transfer shaft 26.

For this purpose, the transfer shaft 26 is divided into first and second shafts 34 and 36, and the torque combining device 6 is disposed between the first and second shafts 34 and 36. The first shaft 34 is connected to the third ring gear R3, the second shaft 36 is connected to the third sun gear S3, and the third planet carrier PC3 is connected to the second output gear 28.

At this time, the direct-coupling clutch E/C is disposed between the second shaft 36 and the second output gear 28, a first input gear 38 engaged with the first output gear 24 is formed at the first shaft 34, a second input gear 42 engaged with an output gear 40 of the first power delivery shaft 10 is formed at the second shaft 36.

Operations and effects of the second exemplary embodiment is the same as those of the first exemplary embodiment except for a position of the torque combining device 6. Therefore, a detailed description of the operations and effects will be omitted.

According to exemplary embodiments of the present invention, torque of an engine is divided into two portions. A portion of the torque is transmitted to a launching device and a transmission device disposed on a first power delivery path, and the other portion of the torque is transmitted to a torque combining device disposed on a second power delivery path.

The portion of the torque is added to the other portion of the torque at the torque combining device, and a final torque is output.

Since the torque of the engine is transmitted through two paths, not through one path according to exemplary embodiments of the present invention, design capacity (diameter of a shaft, thickness of a case, size and the number of clutch) of the components used in the launching device and the transmission device may be smaller than that of the components used in a conventional launching device and transmission device. Accordingly, size of the transmission can be reduced.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque split type automatic transmission, which transmits a torque output from an engine through two paths, adds first and second torques that pass through the two paths respectively and that are increased in each path, and outputs a final torque,
    wherein the torque of the engine is dividedly transmitted to first and second power delivery paths forming the two paths,
    wherein a launching device for continuously receiving and converting the first torque and a transmission device for achieving multiple-shifts are disposed on the first power delivery path in series,
    wherein a torque combining device is disposed on the second power delivery path and continuously receives the second torque, and
    wherein the first power delivery path is connected to the torque combining device such that output torque of the first power delivery path is added to output torque of the second power delivery path to output the final torque,
    wherein the second torque transmitted through the second power delivery path is larger than the first torque transmitted through the first power delivery path.

2. The torque split type automatic transmission of claim 1, wherein the launching device disposed on the first power delivery path is a torque converter, the transmission device disposed on the first power delivery path is a multiple-shift transmission comprising a plurality of planetary gear sets, clutches, and brakes, and the torque combining device disposed on the second power delivery path is a planetary gear set.

3. A torque split type automatic transmission comprising:
    a launching device being a torque converter wherein the launching device continuously receives a first portion of torque of an engine, converts the first portion of the torque by a torque converting ratio, and outputs a converted torque;
    a transmission device connected to the launching device, wherein the transmission device receives the converted torque from the launching device and outputs an output torque, wherein the transmission device is a multiple-shift transmission for converting the converted torque when shifting to output the output torque; and
    a torque combining device being a third planetary gear set, wherein the torque combining device continuously receives a second portion of the torque of the engine, receives the output torque from the transmission device, and adds the output torque and the second portion of the torque to output a final torque;
    wherein the third planetary gear set is a single pinion planetary gear set; and
    wherein a third sun gear of the third planetary gear set is connected to a first power delivery shaft to receive the second portion of the torque of the engine, a third ring gear of the third planetary gear set is coupled to a transfer shaft provided with one end engaged with a first output gear of the transmission device, and a third planet carrier of the third planetary gear set is connected to a second output gear to output the final torque.

4. The torque split type automatic transmission of claim 3, wherein the launching device, the transmission device, and the torque combining device are sequentially disposed from the engine.

5. The torque split type automatic transmission of claim 4, wherein the launching device and the transmission device are sequentially disposed from the engine on the second power delivery shaft.

6. The torque split type automatic transmission of claim 4, wherein the torque combining device is disposed on the first power delivery shaft connected to the engine.

7. The torque split type automatic transmission of claim 3, wherein a second power delivery shaft is connected to a turbine of the torque converter, and the transmission device is disposed at a rear portion of the second power delivery shaft.

8. The torque split type automatic transmission of claim 7, wherein an impeller of the torque converter is connected to a front cover connected to the engine.

9. The torque split type automatic transmission of claim 8, wherein the turbine is connected to the second power delivery shaft and a damper is placed on the second power delivery shaft, and the impeller and the turbine are selectively coupled each other by a lock-up clutch.

10. The torque split type automatic transmission of claim 3, wherein the transmission device comprises first and second planetary gear sets, each of the first and second planetary gear sets being single pinion planetary gear sets,
    wherein a first planet carrier of the first planetary gear set is directly connected to a second ring gear of the second planetary gear set, and a first ring gear of the first planetary gear set is directly connected to a second planet carrier of the second planetary gear set, such that a first sun gear of the first planetary gear set is operated as a first rotational element, the first planet carrier and the second ring gear are operated as a second rotational element, the first ring gear and the second planet carrier are operated as a third rotational element, and a second sun gear of the second planetary gear set is operated as a fourth rotational element, and
    wherein the first rotational element is selectively connected to the second power delivery shaft directly by a first clutch that is placed on the second power delivery shaft,
    wherein the third rotational element is selectively connected to the second power delivery shaft by a second clutch that is placed on the second power delivery shaft, and the third rotational element is selectively connected to a transmission housing by a first brake that is placed between the transmission housing and the third rotational element, the first brake being disposed in parallel with a one-way clutch, the fourth rotational element is selectively connected to the second power delivery shaft by a third clutch placed between the fourth rotational element and the second power delivery shaft, and the fourth rotational element is selectively connected to the transmission housing by a second brake placed between the fourth rotational element and the transmission housing, and the second rotational element is operated as an output element and is engaged to the third ring gear of the torque combining device through the transfer shaft.

11. The torque split type automatic transmission of claim 10, wherein the first clutch is disposed at a front portion of the first planetary gear set, the first and second brakes and the one-way clutch are disposed at a rear portion of an exterior of the second planetary gear set, and the second and third clutches are disposed at a rear portion of the second planetary gear set.

12. The torque split type automatic transmission of claim 3, wherein a direct-coupling clutch for selectively coupling the first power delivery shaft with the second output gear is disposed between the first power delivery shaft and the second output gear.

13. The torque split type automatic transmission of claim 3, wherein the torque combining device is disposed on the transfer shaft disposed in parallel with and apart from the transmission device by a predetermined distance.

14. The torque split type automatic transmission of claim 13, wherein the transfer shaft is divided into first and second shafts and the torque combining device is disposed between the first and second shafts, and wherein the first shaft receives the torque from the first output gear of the transmission device and is connected to the third ring gear, the second shaft receives the torque from the first power delivery shaft and is connected to the third sun gear, and the third planet carrier is connected to the second output gear to output the final torque.

15. The torque split type automatic transmission of claim 14, wherein a direct-coupling clutch is disposed between the second shaft and the second output gear to directly couple the second shaft and the second output gear.

* * * * *